US006965670B1

(12) United States Patent
Kunisch

(10) Patent No.: US 6,965,670 B1
(45) Date of Patent: Nov. 15, 2005

(54) METHOD FOR OPTIMIZING THE TRANSMISSION PROPERTIES AND THE POWER LOSS OF A HIGH-VOLTAGE PART WHICH IS INTEGRATED IN A SUBSCRIBER CONNECTION CIRCUIT FOR CONNECTING A SUBSCRIBER CONNECTION LINE

(75) Inventor: Paul Kunisch, Puchheim (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/763,348

(22) PCT Filed: Aug. 11, 1999

(86) PCT No.: PCT/DE99/02513

§ 371 (c)(1),
(2), (4) Date: Feb. 20, 2001

(87) PCT Pub. No.: WO00/10308

PCT Pub. Date: Feb. 24, 2000

(30) Foreign Application Priority Data

Aug. 14, 1998 (DE) .............................. 198 36 958

(51) Int. Cl.⁷ ............................................. H04M 1/00
(52) U.S. Cl. ........................... 379/399.01; 379/387.02; 379/398; 379/413.02
(58) Field of Search .............................. 379/30, 93.01, 379/93.08, 93.09, 349.01, 413.02, 387.02, 379/399.01, 398

(56) References Cited

U.S. PATENT DOCUMENTS 6,192,109 B1 * 2/2001 Amrany et al. ............... 379/30

FOREIGN PATENT DOCUMENTS

DE    27 33 662    6/1978
DE    3433900 A1    3/1986

OTHER PUBLICATIONS

A Subscriber Line Interface Circuit (SLIC) in a New BiCMOS/DMOS Technology, Zojer et al., pp. 93-96.
XP-000731500—Saving Dynamic Power in HDSL Line Driving Applications, Nash.
ISSCC95/Session 20/RF/Baseband Processing/Paper FP 20.4, Chang et al.

* cited by examiner

Primary Examiner—Jefferey F. Harold
(74) Attorney, Agent, or Firm—Jacob Eisenberg; Siemens AG

(57) ABSTRACT

A method for optimizing the transmission properties and power loss of a high voltage part integrated in a subscriber line circuit for connecting a subscriber line wherein, during XDSL data transmission in the high voltage part, current sources which are integrated in the high voltage part and which supply current to the units present in the high voltage part for the purpose of amplifying or measuring telephone signals and/or data signals (which are situated above the frequency band provided for speech), are set, no later than when such data signals are received in the high voltage part, to current values which are higher than the current values for exclusive transmission of telephone signals situated within the voice band provided for speech, such that the data signals within the high voltage part are transmitted with a high bandwidth largely without distortions and the power loss of the high voltage part is optimized.

6 Claims, 1 Drawing Sheet

METHOD FOR OPTIMIZING THE TRANSMISSION PROPERTIES AND THE POWER LOSS OF A HIGH-VOLTAGE PART WHICH IS INTEGRATED IN A SUBSCRIBER CONNECTION CIRCUIT FOR CONNECTING A SUBSCRIBER CONNECTION LINE

BACKGROUND OF THE INVENTION

1. Field of the Invention

The present invention relates to a method for optimizing the transmission properties and power loss of a high voltage part, which is integrated in a subscriber line, within a digital telephone exchange wherein telephone signals and data signals are amplified and measured for the purpose of further processing such that, ultimately, the data signals within the high voltage part are transmitted with a high bandwidth substantially without distortions and the power loss of the high voltage part is optimized.

2. Description of the Prior Art

The above-referenced high voltage part is integrated in a subscriber line circuit for connecting a subscriber line in the form of a two-wire copper line. Such a high voltage part is disclosed, by way of example, in the article "A 150 V Subscriber Line Interface Circuit (SLIC) in a new BiCMOS/DMOS—Technology" by Zojer B. et al., Meeting, US, New York, IEEE 1996, pp. 93–96, ISBN: 0-7803-3517-1. On the two-wire copper line leading to the high voltage part, there is transmission of not only telephone signals, which are situated within a frequency band provided for speech, (e.g., telephone signals produced by speech, fax or modem applications), but also data signals (e.g., for multimedia services), whose frequency band is situated above the frequency band provided for speech. In this context, such data signals coming from the subscriber line circuit are transmitted at a high rate (e.g., 1.5 Mbit/s, 2 Mbit/s or 6 Mbit/s) within a broadband transmission channel. Conversely, in the direction toward the subscriber line circuit, such data signals are generally transmitted at a low data rate.

This increase in bandwidth of such subscriber lines in the form of two-wire copper lines is made possible by so-called XDSL technology (Digital Subscriber Line), a new type of transmission method for high-speed data transmission over the customary two-wire copper lines of a telephone network. To prevent analog telephone signals and the XDSL data signals from influencing one another, the latter occupy a frequency band which is situated above the frequency band provided for speech, wherein the frequency band available for XDSL data transmission extends, by way of example, up to 552 kHz or 1.1 MHz.

In the context of setting up Internet access for subscriber terminals belonging to subscribers to the conventional telephone network, XDSL technology is currently becoming increasingly important.

For the XDSL method, the switching side of a subscriber line circuit contains devices for isolating and combining telephone signals and data signals and also devices for a modulation method used in this context (e.g., DMT, CAP, QAM).

Such a subscriber line circuit also integrates a high voltage part in which, in the direction toward the subscriber line circuit, not only the aforementioned conventional telephone signals but also the data signals, which are situated in a frequency band above that provided for speech and which can be transmitted at a high rate using XDSL technology, are amplified and supplied to the subscriber line. In the opposite direction, the telephone signals and the data signals, which are situated in a frequency band above that provided for speech and can be transmitted using XDSL technology, are measured for the purposes of subsequent A/D conversion.

During XDSL data transmission within such a high voltage part, the oscillation curve profile of the analog data signals situated within this high frequency band contains intense nonlinear distortions through the zero point. Above all, These distortions have an adverse effect on the bandwidth and further processing, e.g., in the form of A/D conversion and decoding of the data signals.

In the context of XDSL technology, HDSL technology (high bit rate digital subscriber line) is known, for example. The article "Saving Dynamic Power In HDSL Line Driving Applications" by Nash E., Electronic Design, US, Penton Publishing, Cleveland, Ohio, Vol. 45, No. 12, Jun. 9, 1997 (1997-06-09), pages 88, 90, 92, XP000731500, ISSN: 0013-4872 describes a circuit for an HDSL line driver which is of optimum design in terms of its power loss and distortions in the high bit rate data signals. This article does not explain the extent to which the HDSL line driver is able to satisfy the exchange-side requirements of optimum transmission of pure telephone signals or pure data signals, or the possible simultaneous transmission of telephone signals and data signals.

An object of the present invention is, therefore, to devise a method of the type specified in the precharacterizing clause of patent claim 1 such that the data signals, which are situated above the frequency band provided for speech, are transmitted in a high voltage part with as little distortion as possible and with the highest bandwidth possible, and at the same time the power loss of the high voltage part is optimized.

SUMMARY OF THE INVENTION

Thus according to the present invention, the transmission properties of such a high voltage part are optimized by virtue of the fact that current sources which are integrated in the high voltage part and which supply current to the units present in the high voltage part for the purpose of amplifying or measuring telephone and data signals are set, no later than when such data signals are received in the high voltage part, to current values wherein the data signals within the high voltage part are transmitted with a high bandwidth largely without distortions. In this context, the current values to be set are above the current values for exclusive transmission of telephone signals situated within the frequency band provided for speech.

The method according to the present invention is thus used, without any additional hardware complications, to put the high voltage part into a state which is ideal for XDSL data transmission. In this state, the occurrence of distortions at the zero point of such data signals' oscillation curve profile is prevented, the bandwidth is increased and the power loss of the high voltage part is optimum.

In an advantageous embodiment of the present invention, if neither data signals nor telephone signals are being transmitted in the high voltage part, such current sources supply each of the units present in the high voltage part only with current required for their quiescent operation. This puts the high voltage part into a so-called quiescent state with minimum power loss.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
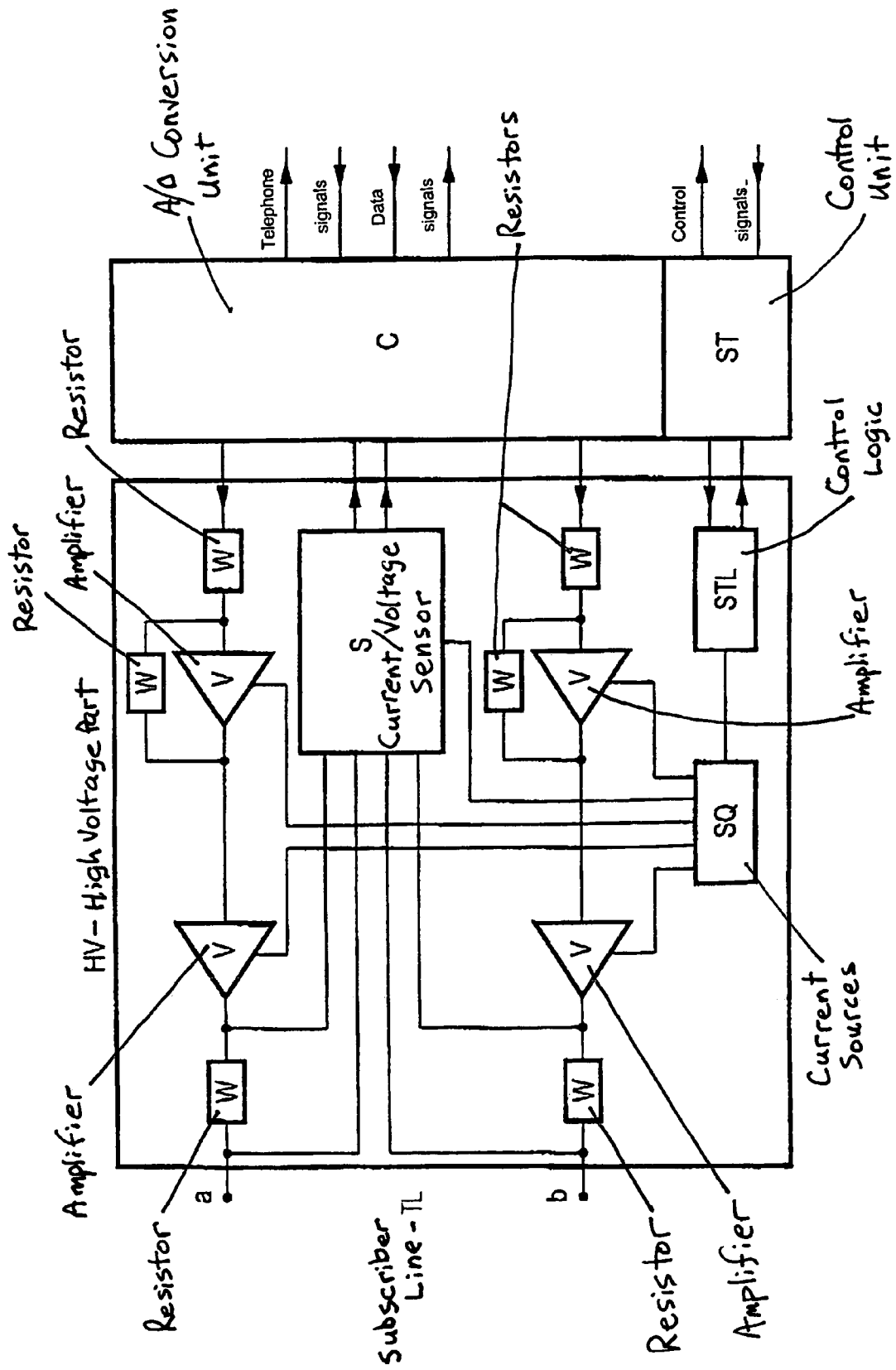
FIG. 1 shows a high voltage part HV integrated in a subscriber line circuit for connecting a subscriber line TL, with a downstream-connected A/D conversion unit C, including its control unit ST.

A subscriber line TL in the form of a two-wire copper line a, b leads into the high voltage part. In the high voltage part, there is a respective connection to a current/voltage sensor S from wire a of the copper line and from wire b of the copper line. From the current/voltage sensor S, the two connections continue to the A/D conversion unit C.

In the opposite direction, two connections run from the A/D conversion unit to respective units having an amplification function, which are situated in the high voltage part. These units having an amplification function are indicated in FIG. 1 via the amplifiers V with respective resistors W connected in parallel and in series. The path of the aforementioned connections finally ends in the wires a, b at the output of the high voltage part.

The A/D conversion unit has the function of converting the analog telephone and data signals coming from the high voltage part into digital telephone and data signals. The A/D conversion unit also has the function of offloading these telephone and data signals, in each case separately, onto an outgoing line provided for telephone signals and onto an outgoing line provided for data signals.

In the opposite direction, the A/D conversion unit receives digital telephone signals and data signals via respective dedicated lines. These signals are converted into analog telephone and data signals and are transmitted in the direction of the amplifiers. Integrated in the A/D conversion unit is a control unit ST from which lines for control signals emerge and, at one end, lead away from the A/D conversion unit and, at the other end, lead to control logic STL integrated in the high voltage part. The control logic is connected to current sources, which are integrated in the high voltage part and are indicated by SQ in FIG. 1, and carries out setting for the current sources. Running from the current sources are a respective line to each of the amplifiers V and a line to the current/voltage sensor S. These lines are used by the current sources to supply current to the amplifiers and to the current/voltage sensor.

During XDSL data transmission, data signals from the wires a, b are received in the current/voltage sensor S, where their current and voltage amplitude values are determined. From there, the data signals enter the A/D conversion unit C which carries out A/D conversion on the analog data signals and sends the digital data signals obtained from A/D conversion to the outgoing lines for data signals. The control unit integrated in the A/D conversion unit records the received data signals in the A/D conversion unit and reports this to the control logic in the high voltage part. The control logic then sets the current sources to the current values and operating points ideal for XDSL data transmission, which are above the current values for exclusive transmission of telephone signals. The fact that the current/voltage sensor is supplied with a higher current value by the voltage sources changes the transfer function in the current/voltage sensor. This results in virtually no nonlinear distortions arising in the data signals.

As an alternative to this, before the XDSL data signals are transmitted, a so-called wakeup signal can be sent from outside in the direction of the high voltage part, entering the high voltage part via the wires a, b. From the high voltage part, the wakeup signal is forwarded to the A/D conversion unit in which the control unit records the wakeup signal and reports this to the control logic. Accordingly, the control logic sets the current sources to the current values and operating points which are ideal for the XDSL data transmission which is still imminent. This allows the high voltage part to be put into the ideal operating state for XDSL data transmission with optimum power loss even before XDSL data transmission starts.

In the opposite direction, digital telephone and data signals are received in the A/D conversion unit via their lines. In the A/D conversion unit, the D/A conversion is carried out on the telephone and data signals. The analog telephone and data signals obtained are sent in the direction of the high voltage part. In the high voltage part, the telephone and data signals are amplified by the amplifiers and are supplied to the wires a, b.

Before XDSL data transmission is initiated, the control unit in the A/D conversion unit monitors the incoming data signal lines either for any incoming digital data signals or, possibly, for a wakeup signal. Reception of such data signals or of the wakeup signal is reported to the control logic, which, in turn, sets the current sources to the current values and operating points which are ideal for XDSL data transmission. As a result, the high voltage part is put into the ideal operating state for XDSL data transmission with optimum power loss. The current sources' current values, which are higher than the current values for exclusive transmission of telephone signals, have an effect on the nonlinearities and the bandwidth of the amplifiers. This allows the amplification-related distortions in the data signals to be prevented and, further, allows the bandwidth to be increased.

When XDSL data transmission has ended, i.e. when data signals are received in the A/D conversion unit neither from the high voltage part nor via the lines for data signals, this circumstance is recorded by the control unit and a message is passed on to the control logic. The control logic resets the current values of the current source accordingly. The setting of the current values is dependent on whether or not telephone signals are still being transmitted. For the case in which only telephone signals are being transmitted, the current values are set such that the high voltage part is put into a state suitable for pure telephone signal transmission. If no telephone or data signals at all are being transmitted, current values required for the quiescent state of the units present in the high voltage part are set so that the high voltage part changes over to a quiescent mode with minimum power loss.

Although the present invention has been described with reference to specific embodiments, those of skill in the art will recognize that changes may be made thereto without departing from the spirit and scope of the invention as set forth in the hereafter appended claims

What is claimed is:

1. A method for optimizing transmission properties and power loss of a high voltage part, integrated in a subscriber line circuit for connecting a subscriber line, within a digital telephone exchange, the method comprising the steps of:
   amplifying and supplying to the subscriber line, in the high voltage part and in a direction toward the subscriber line, both telephone signals and data signals, wherein the telephone signals are situated within a frequency band provided for speech and the data signals are situated in a frequency band above that provided for speech and can be transmitted at a high rate;

measuring both the telephone signals, situated within the frequency band provided for speech and coming from the subscriber line, and the data signals, situated in a frequency band above that provided for speech and coming from subscriber line, for purposes of further processing; and setting current sources, which are integrated in the high voltage part and which supply current to units present in the high voltage part, the current determining operating point settings of the units, for amplifying and measuring the telephone and data signals, no later than when the data signals are received in the high voltage part, to current values which are higher than current values for exclusive transmission of the telephone signals situated within the frequency band provided for speech, wherein the data signals within the high voltage part are transmitted with a high bandwidth substantially without distortions, and the power loss of the high voltage part is optimized.

2. A method for optimizing transmission properties and power loss of a high voltage part as claimed in claim 1, the method further comprising the step of:

supplying, via the current sources, each of the units present in the high voltage part only with current required for quiescent operation of the units if neither data signals nor telephone signals are being transmitted in the high voltage part.

3. A method for optimizing transmission properties and power loss of a high voltage part as claimed in claim 1, wherein the processing of the telephone signals and data signals indicates if telephone transmission, data transmission or an idle mode is present.

4. A method for optimizing transmission properties and power loss of a high voltage part as claimed in claim 3, wherein a low current value is set when an idle mode is present.

5. A method for optimizing transmission properties and power loss of a high voltage part as claimed in claim 4, wherein a second current value is set when telephone transmission is present, said second value being higher than said low current value.

6. A method for optimizing transmission properties and power loss of a high voltage part as claimed in claim 5, wherein a third current value is set when data transmission is present, said third value being higher than said second current value.

* * * * *